United States Patent
Pokkunuri et al.

(10) Patent No.: US 11,197,176 B2
(45) Date of Patent: Dec. 7, 2021

(54) METHODS, SYSTEMS, AND COMPUTER READABLE MEDIA FOR PROVIDING FOR POLICY-BASED ACCESS AND MOBILITY MANAGEMENT FUNCTION (AMF) SELECTION USING NETWORK SLICE SELECTION ASSISTANCE INFORMATION (NSSAI) AVAILABILITY INFORMATION

(71) Applicant: Oracle International Corporation, Redwood Shores, CA (US)

(72) Inventors: Sairam Sudhir Pokkunuri, Bangalore (IN); Abhishek Mukherjee, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 68 days.

(21) Appl. No.: 16/676,006

(22) Filed: Nov. 6, 2019

(65) Prior Publication Data
US 2021/0136602 A1 May 6, 2021

(51) Int. Cl.
H04L 29/08 (2006.01)
H04W 24/02 (2009.01)

(52) U.S. Cl.
CPC ............. *H04W 24/02* (2013.01); *H04L 67/02* (2013.01)

(58) Field of Classification Search
CPC ................................ H04W 24/02; H04L 29/08
See application file for complete search history.

(56) References Cited

U.S. PATENT DOCUMENTS

2017/0303259 A1* 10/2017 Lee ...................... H04W 12/08
2018/0316564 A1 11/2018 Senarath
(Continued)

FOREIGN PATENT DOCUMENTS

CN 109600262 A 4/2019
WO WO 2017/032280 A1 3/2017
(Continued)

OTHER PUBLICATIONS

Commonly-Assigned, co-pending U.S. Appl. No. 16/712,973 for "Methods, Systems, and Computer Readable Media for Providing for Network Slice Management Using Feedback Mechanism," (Unpublished, filed Dec. 12, 2019).
(Continued)

*Primary Examiner* — Chi Ho A Lee
(74) *Attorney, Agent, or Firm* — Jenkins, Wilson, Taylor & Hunt, P.A.

(57) ABSTRACT

A method for providing for policy-based access and mobility management function (AMF) selection using network slice selection assistance information (NSSAI) availability information obtained from an NSSAI availability service includes, at a network slice selection function (NSSF) including at least one processor, obtaining, from an NSSAI availability service, NSSAI availability information regarding a plurality of AMFs. The method further includes receiving, from a first AMF, a network slice selection request specifying a network slice service requested by a user equipment (UE). The method further includes generating, based on the NSSAI availability information and the network slice service requested by the UE, a prioritized list including an identity of at least one AMF for supporting the network slice service. The method further includes communicating the prioritized list to the first AMF.

18 Claims, 8 Drawing Sheets

(56) References Cited

U.S. PATENT DOCUMENTS

| | | | |
|---|---|---|---|
| 2018/0317134 A1 | 11/2018 | LeRoux et al. | |
| 2018/0317163 A1 | 11/2018 | Lee et al. | |
| 2018/0332523 A1* | 11/2018 | Faccin | H04W 36/14 |
| 2019/0124181 A1* | 4/2019 | Park | H04W 74/0833 |
| 2019/0141606 A1* | 5/2019 | Qiao | H04W 48/04 |
| 2019/0207778 A1* | 7/2019 | Qiao | H04M 15/61 |
| 2019/0222489 A1 | 7/2019 | Shan | |
| 2019/0274038 A1* | 9/2019 | Wu | H04W 36/0033 |
| 2019/0335392 A1* | 10/2019 | Qiao | H04W 76/27 |
| 2019/0356558 A1 | 11/2019 | Han et al. | |
| 2019/0357301 A1 | 11/2019 | Li et al. | |
| 2020/0029200 A1* | 1/2020 | Yu | H04W 8/20 |
| 2020/0044943 A1 | 2/2020 | Bor-Yaliniz et al. | |
| 2020/0053617 A1* | 2/2020 | Park | H04W 36/0066 |
| 2020/0314701 A1* | 10/2020 | Talebi Fard | H04W 36/0033 |
| 2020/0396678 A1* | 12/2020 | Lee | H04W 60/04 |
| 2021/0051070 A1* | 2/2021 | Akman | H04L 41/5048 |
| 2021/0185695 A1 | 6/2021 | Gupta et al. | |

FOREIGN PATENT DOCUMENTS

| | | |
|---|---|---|
| WO | WO 2018/170135 A1 | 9/2018 |
| WO | WO 2019/154295 A1 | 8/2019 |
| WO | WO 2019/158737 A1 | 8/2019 |
| WO | WO 2019/158777 A1 | 8/2019 |
| WO | WO 2019/197883 A1 | 10/2019 |

OTHER PUBLICATIONS

"3rd Generation Partnership Project; Technical Specification Group Services and System Aspects; Management and orchestration; Provisioning; (Release 16)," 3GPP TS 28.531, V16.3.0, pp. 1-70 (Sep. 2019).

"3rd Generation Partnership Project; Technical Specification Group Core Network and Terminals; 5G System; Network Data Analytics Services; Stage 3 (Release 16)," 3GPP TS 29.520, V16.1.0, pp. 1-54 (Sep. 2019).

"3rd Generation Partnership Project; Technical Specification Group Services and System Aspects; Telecommunication management; Study on management and orchestration of network slicing for next generation network (Release 15)," 3GPP TR 28.801, V15.1.0, pp. 1-75 (Jan. 2018).

Mannweiler, "5G Mobile Network Architecture for diverse services, use cases, and applications in 5G and beyond Deliverable D2.2 Initial overall architecture and concepts for enabling innovations," H2020-ICT-2016-2, 5G-MoNArch, Project No. 761445, pp. 1-111 (2018).

Barmpounakis et al., "Data Analytics for 5G Networks: A Complete Framework for Network Access Selection and Traffic Steering," International Journal on Advances in Telecommunications, vol. 11, No. 3 & 4, pp. 101-114 (2018).

Non-Final Office Action for U.S. Appl. No. 16/712,973 (dated Nov. 23, 2020).

Rapporteurs and Volunteers, "5GS Open Topics Collection for SA2#122," 3GPP Draft; S2-174251 5GS—Status Track—Open Topics—V5 1 3, 3rd Generation Partnership Project (3GPP), vol. SA WG2, pp. 1-12, (May 15-19, 2017).

"3rd Genelalion Partnership Project; Technical Specification Group Core Network and Terminals; 5G System; Network Slice Selection Services; Stage 3 (Release 16)," 3GPP TS 29.531, VCT WG4, No. V16.0.0, pp. 1-53 (Sep. 23, 2019).

International Search Report and Written Opinion for International Patent Application No. PCT/US2020/051884, pp. 1-19, dated (Dec. 8, 2020).

"3rd Generation Partnership Project; Technical Specification Group Core Network and Terminals; 5G System; Network Function Repository Services; Stage 3 (Release 16)," 3GPP TS 29.510, V16.1.1, pp. 1-150 (Oct. 2019).

"3rd Generation Partnership Project; Technical Specification Group Services and System Aspects; Procedures for the 5G System (5GS); Stage 2 (Release 16)," 3GPP TS 23.502, V16.2.0, pp. 1-525 (Sep. 2019).

"3rd Generation Partnership Project; Technical Specification Group Services and System Aspects; System Architecture for the 5G System (5GS) Stage 2 (Release 16)," 3GPP TS 23.501, V16.2.0, pp. 1-391 (Sep. 2019).

"Oracle® Communications Network Slice Selection Function (NSSF) Cloud Native User's Guide," Oracle, Release 1.0, F16990-01, pp. 1-29 (Apr. 2019).

Saboorian et al., "Network Slicing and 3GPP Service and Systems Aspects (SA) Standard," IEEE Software Defined Networks, pp. 1-7 (Dec. 2017).

Foy et al., "Network Slicing—3GPP Use Case draft-defoy-netslices-3gpp-network-slicing-02," Network Working Groups, pp. 1-14 (Oct. 16, 2017).

Applicant-Initiated Interview Summary for U.S. Appl. No. 16/712,973 (dated May 3, 2021).

Notification of Transmittal of the International Search Report and the Written Opinion of the International Searching Authority, or the Declaration for International Application No. PCT/US2020/064137 (dated Mar. 18, 2021).

"3rd Generation Partnership Project; Technical Specification Group Services and System Aspects; Study of Enablers for Network Automation for 5G (Release 16)," 3GPP TR 23.791, V16.2.0, pp. 1-124 (Jun. 2019).

Final Office Action for U.S. Appl. No. 16/712,973 (dated Jul. 30, 2021).

\* cited by examiner

METHODS, SYSTEMS, AND COMPUTER READABLE MEDIA FOR PROVIDING FOR POLICY-BASED ACCESS AND MOBILITY MANAGEMENT FUNCTION (AMF) SELECTION USING NETWORK SLICE SELECTION ASSISTANCE INFORMATION (NSSAI) AVAILABILITY INFORMATION

TECHNICAL FIELD

The subject matter described herein relates to network slicing. More particularly, the subject matter described herein relates to methods, systems, and computer readable media for providing for policy-based AMF selection using NSSAI availability information.

BACKGROUND

In 5G telecommunications networks, a network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of IP address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

One example of an NF that provides services to user equipment (UE) devices, such as Internet of Things (IoT) devices, is the access and mobility management function or AMF. The AMF provides registration management, connection management, reachability management, mobility management, and other services for UE devices. The AMF serves as the point of contact between the radio access network and the remaining nodes in the 5G core network. The AMF also serves as the point of access to network slice services.

There may be many AMFs serving a particular transfer area (TA) in which a UE is located. It is desirable to optimize AMF resource utilization and, in particular, if network slicing is implemented. Network slicing is a service provided in 5G networks where network resources are logically allocated in portions or slices for use by UE devices. Each network slice may provide particular capabilities or service to a UE. Different network slices and capabilities may be accessible via different AMFs. In addition, the same AMF may provide access to different capabilities or network slices.

When a UE registers with a public land mobile network (PLMN), during the registration procedure, the UE may communicate requested NSSAI information to the network indicating a type of network slice services requested by the UE. If the radio access node that receives the NSSAI information from the UE is capable of identifying an AMF that can provide the access to the requested network slice services, the radio access node forwards the registration request to the AMF, and the AMF provides access to the requested network slice services. However, in certain instances, the radio access node may not be capable of identifying an AMF that can provide access to the requested network slice services. One example of such a situation is when the requested NSSAI from the UE in a non-access stratum (NAS) registration request message is not a configured NSSAI for the PLMN, an allowed NSSAI for the PLMN and access type, or a default configured NSSAI. In such instances, the radio access node will route the NAS signaling to a default AMF.

When a UE context in the default AMF does not yet include an allowed NSSAI corresponding to the access type requested by or for the UE, the AMF queries the network slice selection function (NSSF) to identify an AMF that is capable of providing access to the requested network slice services. In another example, the network may decide to reallocate a UE to a different AMF than the AMF that initially receives an initial registration request.

According to 3GPP TS 23.501, the network slice selection function provides two different services, referred to as $N_{NSSF}$_NS selection service (hereinafter, "NS selection service") and $N_{NSSF}$_NSSAI availability service (hereinafter, "NSSAI availability service"). NS selection service includes providing network slice information to a requestor. NSSAI availability service advises an NF consumer of the availability of subscribed NSSAIs (S-NSSAIs) on a per-TA basis.

One problem with the existing 3GPP service architecture is that the NSSAI availability service and the NS selection service are decoupled. In other words, 3GPP TS 23.501 does not specify how to use the NSSAI availability service to optimize AMF selection in a manner that most efficiently allocates AMFs and network slice resources accessible via the AMFs.

For example, clause 5.15.5.2.1 of 3GPP TS 23.501 indicates that when multiple network slice instances in the UE's transfer area are able to serve a given subscribed NSSAI (S-NSSAI), based on the operator's configuration, the NSSF may select one of the network slice instances to serve the UE. A network slice instance is a set of NF instances and the required resources that form a deployed network slice. The AMF is the network node that provides access to the network slice instance. By leaving the selection of the network slice instance and corresponding AMF to the discretion of the network operator, 3GPP TS 23.501 does not define procedures for optimizing such selection. Thus, even though NSSAI availability information can be provided by the AMFs to the NSSF, 3GPP TS 23.501 does not specify how to use such information. In addition, other information, such as AMF loading, is not specified as being part of the NS selection process.

Accordingly, there exists a need for methods, systems, and computer readable media for providing for policy-based AMF selection based on NSSAI availability information obtained from an NSSAI availability service.

SUMMARY

A method for providing for policy-based access and mobility management function (AMF) selection using network slice selection assistance information (NSSAI) availability information obtained from an NSSAI availability service includes, at a network slice selection function (NSSF) including at least one processor, obtaining, from an NSSAI availability service, NSSAI availability information regarding a plurality of AMFs. The method further includes receiving, from a first AMF, a network slice selection request specifying a network slice service requested by a user equipment (UE). The method further includes generating, based on the NSSAI availability information and the network slice service requested by the UE, a prioritized list including an identity of at least one AMF for supporting the network slice service. The method further includes communicating the prioritized list to the first AMF.

According to another aspect of the subject matter described herein, obtaining the NSSAI availability information includes receiving hypertext transfer protocol (HTTP) messages from the AMFs, wherein each HTTP message indicates supported NSSAIs per transfer area (TA) for one of the AMFs.

According to yet another aspect of the subject matter described herein, receiving a network slice selection request includes receiving a network slice selection request containing at least one NSSAI identifying a network slice service requested by the UE.

According to yet another aspect of the subject matter described herein, generating the prioritized list includes prioritizing a second AMF that supports the requested network slice service over a third AMF that supports the requested network slice service and a greater number of network slice services in addition to the requested network slice service than the second AMF.

According to yet another aspect of the subject matter described herein, prioritizing the second AMF over the third AMF includes computing a relevance R for the second and third AMFs, where R is equal to C/T, where C is equal to a number of common NSSAIs between NSSAIs requested by the UE and NSSAIs supported by the second or third AMF and T is equal to a total number of NSSAIs supported by the second or third AMF.

According to yet another aspect of the subject matter described herein, the method for providing for policy-based AMF selection includes obtaining load percentages of each of the AMFs.

According to yet another aspect of the subject matter described herein, obtaining the load percentages includes obtaining the load percentages from a network function repository function (NRF).

According to yet another aspect of the subject matter described herein, generating the prioritized list includes computing a weight W for the second and third AMFs, where the weight W is equal to R/L, L is the load percentage of the second or third AMFs.

According to yet another aspect of the subject matter described herein, communicating the prioritized list to the first AMF includes communicating a AMF identities of the second and third AMFs and the weights computed for the second and third AMFs to the first AMF.

According to yet another aspect of the subject matter described herein, communicating the prioritized list to the first AMF includes communicating AMF identities of the second and third AMFs in an order corresponding to the weights computed for the second and third AMFs.

According to yet another aspect of the subject matter described herein, a system for providing for policy-based access and mobility management function (AMF) selection using network slice selection assistance information (NSSAI) availability information obtained from an NSSAI availability service is provided. The system includes a network slice selection function (NSSF) including at least one processor. The system further includes an access and mobility management function (AMF) prioritizer implemented by the at least one processor for obtaining, using an NSSAI availability service, NSSAI availability information regarding a plurality of AMFs using, receiving, from a first AMF, a network slice selection request specifying a network slice service requested by a user equipment (UE), generating, based on the NSSAI availability information and the network slice service requested by the UE, a prioritized list including an identity of at least one AMF for supporting the network slice service, and communicating the prioritized list to the first AMF.

According to yet another aspect of the subject matter described herein, the AMF prioritizer is configured to obtain the NSSAI availability information by receiving hypertext transfer protocol (HTTP) messages from the AMFs, and each HTTP message indicates supported NSSAIs per transfer area (TA) for one of the AMFs.

According to yet another aspect of the subject matter described herein, the network slice selection request contains at least one NSSAI identifying a network slice service requested by the UE.

According to yet another aspect of the subject matter described herein, the AMF prioritizer is configured to generate the prioritized list by prioritizing a second AMF that provides the requested network slice service over a third AMF that supports the requested network slice service and a greater number of network slice services in addition to the requested network slice service than the second AMF.

According to yet another aspect of the subject matter described herein, the AMF prioritizer is configured to prioritize the second AMF over the third AMF by computing a relevance R for the second and third AMFs, where R=C/T, where C is equal to a number of common NSSAIs between NSSAIs requested by the UE and NSSAIs supported by the second or third AMF and T is equal to a total number of NSSAIs supported by the second or third AMF.

According to yet another aspect of the subject matter described herein, the AMF prioritizer is configured to obtain load percentages for the second and third AMFs and to compute weight values W for the second and third AMFs, where the weight value W for the second or third AMF is equal to R/L and L is the load percentage of the second or third AMF.

According to yet another aspect of the subject matter described herein, the AMF prioritizer is configured to obtain the load percentages from a network function repository function (NRF).

According to yet another aspect of the subject matter described herein, the prioritized list of AMFs includes AMF identities of the second and third AMFs and the weights computed for the second and third AMFs.

According to yet another aspect of the subject matter described herein, the prioritized list includes an ordered list of AMF identities of the second and third AMFs and an order of the AMF identities in the list corresponds to the weights computed for the second and third AMFs.

According to yet another aspect of the subject matter described herein, a non-transitory computer readable medium having stored thereon executable instructions that when executed by a processor of a computer control the computer to perform steps is provided. The steps include obtaining, from a network slice selection assistance information (NSSAI) availability service, NSSAI availability information regarding a plurality of AMFs using an NSSAI availability service. The steps further include receiving, from a first AMF, a network slice selection request specifying a network slice service requested by a user equipment (UE). The steps further include generating, based on the NSSAI availability information and the network slice service requested by the UE, a prioritized list including an identity of at least one AMF for supporting the network slice service. The steps further include communicating the prioritized list to the first AMF.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
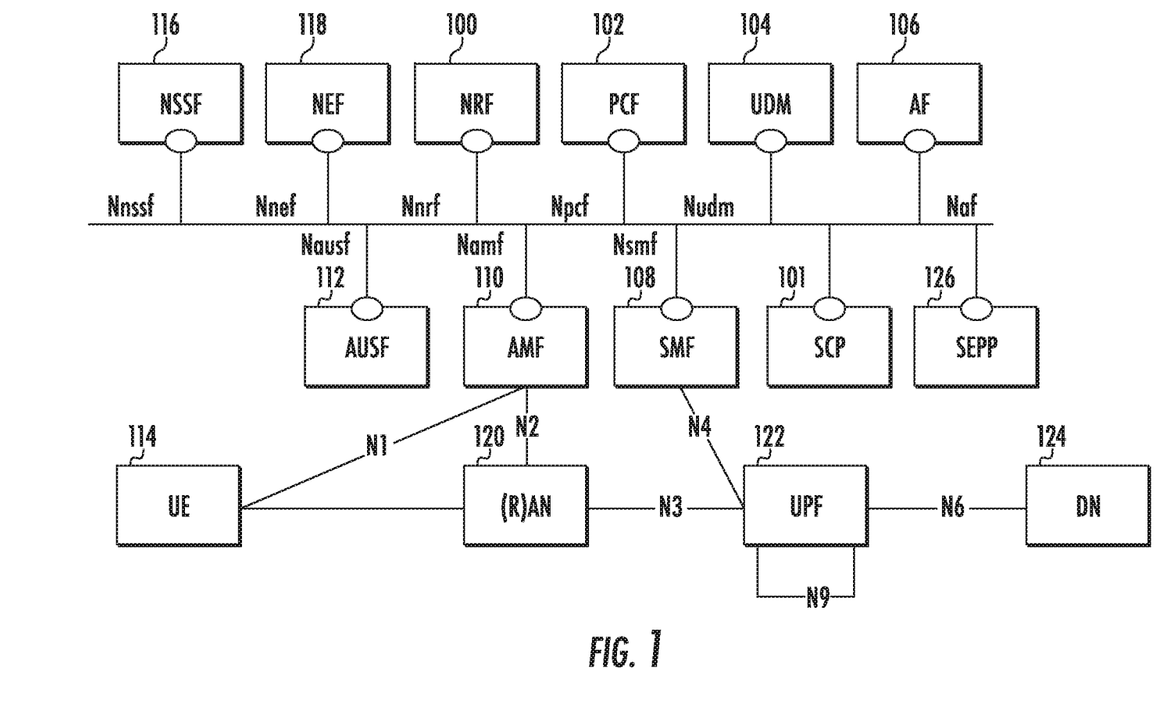
FIG. 1 is a network diagram illustrating an exemplary 5G network architecture.

FIG. 1 is a block diagram illustrating an exemplary 5G system network architecture. In FIG. 1, the network includes NRF 100 and service communications proxy (SCP) 101. As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure defined in 3GPP TS 29.510. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between AMF 110 and PCF 102. AMF 110 performs mobility and registration management operations similar to those performed by a mobility management entity (MME) in 4G networks. AMF 110 also serves as the access point for network slice services. AMF 110 may also perform AMF selection to select the serving AMF will provide access to the network slice services requested by a UE during registration.

An authentication server function (AUSF) 112 performs authentication services for user equipment (UEs), such as UE 114, seeking access to the network.

A network slice selection function (NSSF) 116 provides the above-described NSSAI availability and NS selection services for devices seeking to access specific network capabilities. As will be described in further detail below, NSSF 116 may obtain AMF loading information from an NRF and NSSAI availability information from AMFs. NSSF 116 may store the AMF loading information and NSSAI availability information in an AMF selection database maintained by NSSF 116. When NSSF 116 receives an NSSAI selection request from an AMF, NSSF 116 may utilize the stored AMF loading and NSSAI availability information to compute an AMF relevance score and a weight for each AMF capable of supporting the network slice services requested by a UE seeking access to network slice services. NSSF 116 may generate a prioritized list of AMFs capable of providing the requested services and the corresponding weights and communicate the list to the requesting AMF. The requesting AMF may then use the prioritized list of AMFs and the weights to select an AMF for providing access to the requested network slice services.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Service edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse a minimum of two SEPP functions, one for the home PLMN and the other for the foreign PLMN.

As stated above, one problem with the existing 3GPP network architecture is that it does not provide for use of NSSAI availability or AMF loading information in the AMF selection process. For example, Table 7.2.14 (re-numbered as Table 1) of 3GPP TS 23.501 is set forth below:

TABLE 1

Services Provided by NSSF

| Service Name | Description | Reference in TS 23.502 [3] |
| --- | --- | --- |
| Nnssf_NSSelection | Provides the requested Network Slice information to the Requester. | 5.2.16.2 |
| Nnssf_NSSAIAvailability | Provides NF consumer on the availability of S-NSSAIs on a per TA basis. | 5.2.16.3 |

In Table 1 above, the NSSF provides two distinct services. The first service provides network slice information to a requestor, and the second service provides for NSSAI availability information on a per TA basis. However, there is no link between these two services in 3GPP TS 23.501 or 3GPP TS 23.502 where the services are defined.

For example, as described above, when there are multiple AMFs that can provide access to the network slice services requested by a UE or when the network decides to reallocate a registration to an AMF other than the AMF that initially receives a registration message, the AMF may consult the NSSF to identify an AMF capable of providing the requested services. As per 3GPP TS 23.501, a 5G UE can request up to 8 S-NSSAIs as part of an initial registration procedure. The AMF selected for a UE should support all of the S-NSSAIs requested by the UE (See clause 5.15.2.1 of 3GPP TS 23.501). The NSSAI is a collection of S-NSSAIs. An NSSAI may be a configured NSSAI, a requested NSSAI or an allowed NSSAI. There can be at most eight S-NSSAIs in the allowed and requested NSSAIs sent in signaling messages between the UE and the network. The requested NSSAI signaled by the UE to the network allows the network to select the serving AMF, network slice(s) and network slice instance(s) for the UE, as specified in clause 5.15.5 of 3GPP TS 23.501.

As stated above, AMF reallocation may occur due to network slice support. During a registration procedure in a PLMN, if the network decides that the UE should be served by a different AMF based on network slice aspects, then the AMF that first received the registration request redirects the registration request to another AMF via the RAN or via direct signaling between the initial AMF and the target AMF. If the target AMF(s) are returned from the NSSF and identified by a list of candidate AMF(s), the redirection message shall only be sent via the direct signaling between the initial AMF and the target AMF. If the redirection message is sent by the AMF via the RAN, the message includes information for selection of a new AMF to serve the UE.

For a UE that is already registered, the system supports a redirection initiated by the network of a UE from its serving AMF to a target AMF due to network slice considerations (e.g. the operator has changed the mapping between the network slice instances and their respective serving AMF(s)). Operator policy determines whether redirection between AMFs is allowed.

The subject matter described herein provides for using NSSAI availability information and AMF loading information to generate a prioritized list of AMFs capable of providing access to a requested network slice service and providing the prioritized list to an AMF to facilitate in selecting an optimal AMF to access the requested network slice services. The prioritized list of AMFs can be used to select the serving AMF in any of the instances described above when an AMF is required to select a serving AMF for a UE.

Figure 2:
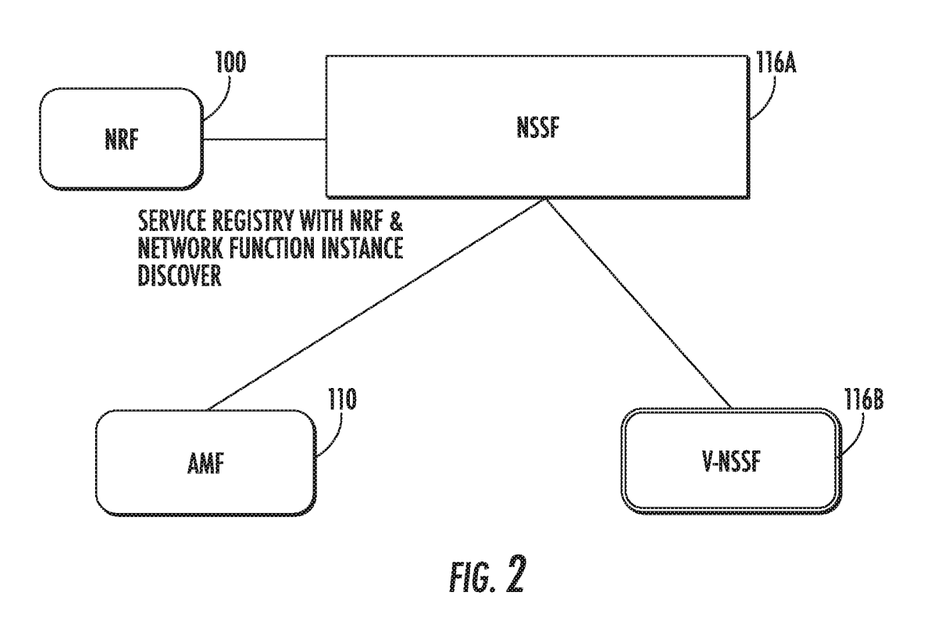
FIG. 2 is a network diagram illustrating exemplary NSSF services.

FIG. 2 is a network diagram illustrating services provided by the NSSF in more detail. In FIG. 2, the NSSF is shown as a physical NSSF 116A and a virtual NSSF (V-NSSF) 116B. NSSFs 116A and 166B are in communication with AMF 110 and NRF 100. NSSF 116A or 116B may register with NRF 100 to receive updates regarding NFs, such as AMF 110 when an AMF is added to the network and with the network slice or other services supported by AMF 110 change. NSSF 116A and 116B may also receive load information from NRF 100 for NFs (such as AMF 110) to which NSSF 116A or 116B subscribe. In operation, NSSF 116A or 116B selects a network slice instance (NSI), determines allowed NSSAI information, and determines the AMF that will serve a UE. AMF 110 can retrieve the NRF, NSI ID, and target AMFs as part of a UE initial registration and packet data unit (PDU) session establishment procedure.

As stated above, two services provided by NSSF 116 are the NSSAI availability service and the NS selection service. The NS selection service is used by an NF service consumer (i.e., an AMF) to retrieve the information related to a network slice. The NS selection service also enables the NSSF to provide to the AMF the allowed NSSAI and the configured NSSAI for the serving PLMN. The NSSAI availability service enables updating with the NSSF of the S-NSSAI(s) that the NF service consumer (e.g., the AMF) supports on a per TA basis. The NSSAI availability service allows the AMF to subscribe to and be notified of any change in status, on a per TA basis, of the S-NSSAIs available per TA (unrestricted) and the restricted S-NSSAI(s) per PLMN in the TA of the serving PLMN of the UE.

3GPP TS 23.502 allows the NSSF to obtain NSSAI availability information from AMFs but does not specify the use of NSSAI availability information for AMF selection. The subject matter described herein includes using NSSAI availability information obtained through the NSSAI availability service to determine weights for the candidate AMFs, the providing of the weights to the requesting AMF, and the utilization of the weights by the requesting AMF to select an AMF to serve a session involving a UE, such as an IoT device.

Figure 3:
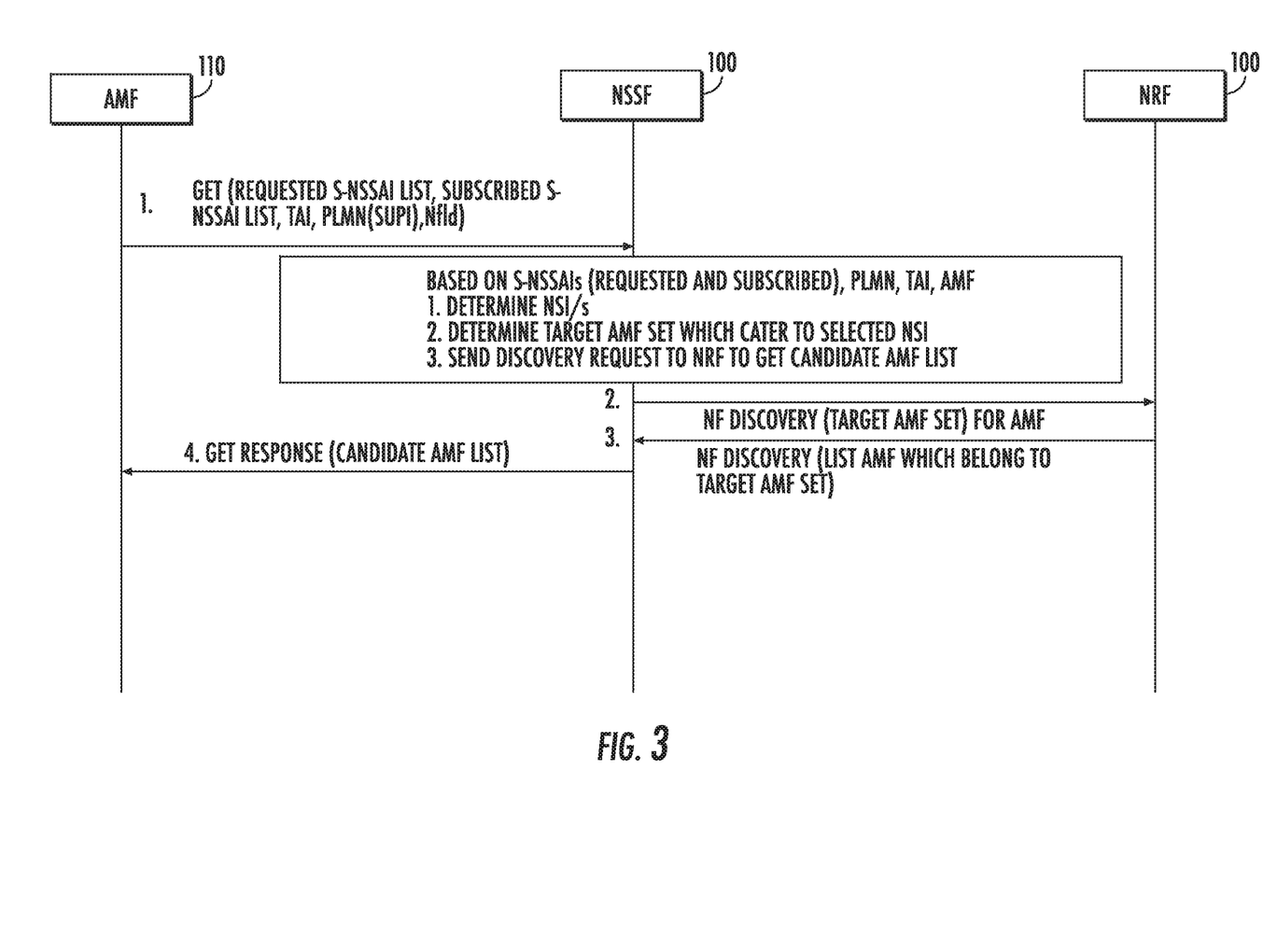
FIG. 3 is a message flow diagram illustrating NS selection service without using NSSAI availability information.

FIG. 3 is a message flow diagram illustrating NS selection service performed without NSSAI availability information. Referring to FIG. 3, in line 1, an AMF 200, which may be a default AMF to which an initial registration of a UE is routed or an AMF that decides for network slice reasons that the initial registration should be routed to a different AMF, sends a hypertext transfer protocol (HTTP) GET message to NSSF 116. The HTTP GET message specifies a list of requested NSSAIs, a list of subscribed NSSAIs, a transfer area identifier (TAI), a PLMN identifier, and a network function identifier, which identifies AMF 200. Based on the requested and subscribed NSSAIs, the PLMN ID, the TA ID, and the identity of the requesting AMF, NSSF 116 determines the network slice identifiers (NSIs) and the target AMFs which provide access to the services identified by the NSIs, and, in line 2, sends an NF discovery request to NRF 100. The NF discovery request specifies the set of target AMFs which provide access to the requested network slice services.

In line 3, NRF 100 responds with the list of AMFs which belong to the target AMF set identified in the request in line 2. In line 4, NSSF 116 sends a response to the requesting AMF with the candidate AMF list. AMF 200 then selects one of the AMFs to provide access to the requested network slice service. It should be noted that NSSAI availability information obtained from the NSSAI availability service is not used in the AMF selection process in FIG. 3.

Figure 4:
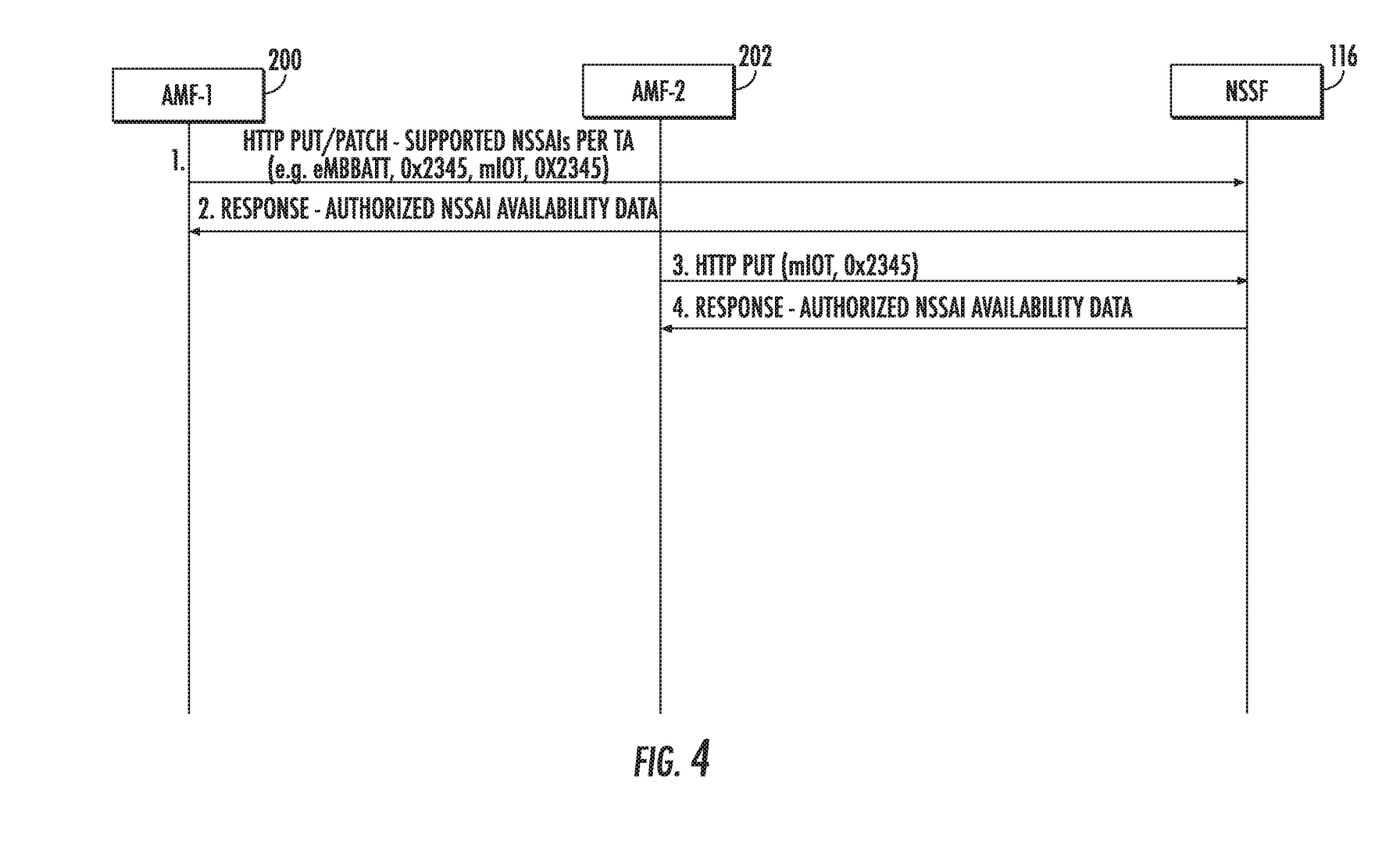
FIG. 4 is a message flow diagram illustrating messages exchanged between an NSSF and AMFs according to an NSSAI availability service.

FIG. 4 is a message flow diagram illustrating NSSF 116 receiving NSSAI availability information via the NSSAI availability service. Referring to FIG. 4, in line 1, NSSF 116 receives an HTTP PUT/PATCH message from AMF1 200. The HTTP PUT/PATCH message contains supported NSSAIs per TA. In the illustrated example, the supported NSSAIs are embedded battery (eMBBATT) and massive IoT (mIOT). The mIOT NSSAI may be requested by or on behalf of a large number of IoT devices requesting the same service from the network. The eMBBATT NSSAI may be requested by a UE, such as an IoT device, with an embedded battery. The parameter 0x2345 is the identifier for the TA. Another example of an NSSAI that may be specified is ultra-reliable low latency communications (URLLC). URLLC can be used for industrial automation and remote-control applications requiring low latency, ultra-reliable communications. Yet another NSSAI that may be specified is enhanced mobile broadband (emBB) for mobile broadband services, such as streaming video.

According to the subject matter described herein, NSSF 116 may store and utilize the NSSAI availability information to provide a list of AMFs to a querying AMF that is utilizing the NF selection service illustrated in FIG. 3. Thus, after line 1, NSSF 116 stores an identifier for AMF1 200 along with the supported NSSAIs per TA for AMF 200, and this data may be used to respond to an NS selection query. In line 2 of the message flow diagram, NSSF 116 responds to AMF1 200 with an authorized NSSAI availability data message acknowledging receipt of the NSSAI availability information.

In line 3 of the message flow diagram, AMF2 202 sends an HTTP PUT information to NSSF 116 identifying mIOT service for the transfer area identified by the identifier 0x2345. In response to the HTTP PUT message, NSSF 116 stores an identifier for AMF2 202, the TA ID, and the NSSAIs. Table 2 shown below illustrates an example of NSSAI availability information that may be stored by NSSF 116 after the call flow illustrated in FIG. 4.

TABLE 2

NSSAI Availability Information Stored by NSSF

| AMF ID | TA ID(s) | NSSAI(s) |
|---|---|---|
| AMF1 | 0 × 2345 | eMBBATT mIOT |
| AMF2 | 0 × 2345 | mIOT |

In Table 2, it can be seen that NSSF 116 stores an AMF identifier, corresponding TA identifiers, and NSSAIs for each TA ID. In the illustrated example, the AMF identifiers are AMF1 and AMF2 identifying AMF1 200 and AMF2 202 illustrated in FIG. 4. The TA identifiers are 0x2345 for both AMF1 and AMF2. It is understood that a given AMF may support multiple TAs, and, in such case, multiple TA IDs may be stored in an AMF selection database maintained by NSSF 116. The third column in Table 2 are the NSSAIs for each TA and each AMF. In the illustrated example, the NSSAIs for AMF1 and TA 0x2345 are eMBBATT and mIOT. The NSSAI for AMF2 202, TA ID 0x2345 is mIOT, indicating that AMF2 202 and TA ID 0x2345 provides access to mIOT service.

Figure 5:
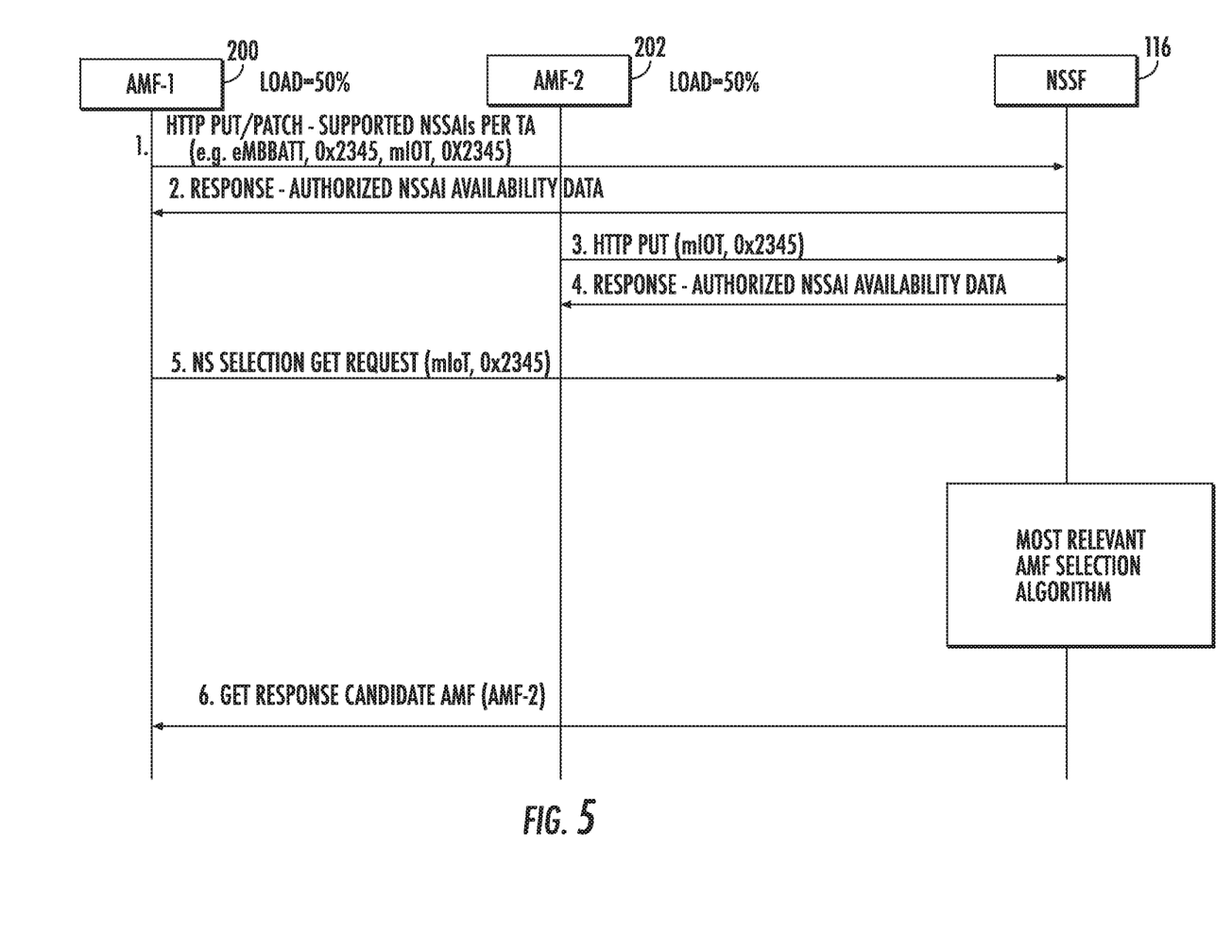
FIG. 5 is a message flow diagram illustrating one example of an NSSF providing for policy-based AMF selection based on NSSAI availability information and AMF loading information.

Once the NSSAI availability information, such as that illustrated in Table 2, is stored by NSSF 116, NSSF 116 may utilize the NSSAI availability information to respond to NS selection requests. FIG. 5 is a message flow diagram illustrating the use of NSSAI availability information to respond to NS selection requests. Referring to FIG. 5, in line 1 of the message flow diagram, AMF1 200 sends an HTTP PUT/PATCH message to NSSF 116. The HTTP PUT/PATCH message contains supported NSSAIs per TA. In the illustrated example, the supported NSSAIs are eMBBATT and mIOT. The TA is identified by the number 0x2345. NSSF 116 receives the HTTP PUT/PATCH message and stores the supported NSSAIs per TA as illustrated in Table 2. In line 2 of the message flow diagram, NSSF 116 responds to the HTTP PUT/PATCH message with an authorized NSSAI availability data message.

In line 3 of the message flow diagram, AMF2 202 sends an HTTP PUT message to NSSF 116 containing the NSSAI availability data mIOT for the TA 0x2345. NSSF 116 receives the HTTP PUT message and stores the NSSAI availability data in its local AMF selection database. In line 4, NSSF 116 responds to AMF2 202 with an authorized NSSAI availability data response message.

In line 5 of the message flow diagram, AMF1 200 sends an NS selection GET request message to NSSF 116. The NS selection GET request message specifies the requested NSSAI, which in the illustrated example is mIOT and the TA ID 0x2345. NSSF 116 receives the NS selection GET request message and executes a most relevant AMF selection algorithm to generate a prioritized list of AMFs capable of providing access to the requested network slice service or services. In one example, the most relevant AMF selection algorithm may utilize at least the following two factors to compute relative AMF priorities:

1. Load of the AMF.
2. Relevance of the AMF.

The first factor is the load of the AMF, which, in one example, is a measure of the current processing load of the AMF. The load of the AMF may be obtained from the NRF in the discovery response message in a message flow similar to that illustrated in FIG. 3. The second factor is the relevance of the AMF, which can be determined using the list of S-NSSAIs supported by the AMF. In one example, a weight W is computed for each AMF which is present in the NRF discovery response. The higher the weight, the higher the AMF is prioritized the response to the NSSAI selection GET request. The weight W may be computed using the following formula:

$W=R/L$, where

W=weight,
R=relevance in percentage of the AMF, and
L=load in percentage of the AMF.

The AMF relevance is defined as the ratio of the lowest number of S-NSSAIs required to serve slices selected to the total number of S-NSSAI supported by the AMF. The AMF relevance is calculated using the following formula:

$R=C/T$,

C=number of common S-NSSAIs between selected and requested NSSAI list, and

T=total number of S-NSSAIs supported by the AMF.

Using the example illustrated in FIG. 5, there is one requested NSSAI, mIOT, in the NS selection GET request in line 5. Both AMF1 and AMF2 have one NSSAI in common with the requested NSSAI, mIOT. Accordingly, the value of C in the relevance equation is equal to 1 for both AMF1 200 and AMF2 202. The total number of NSSAIs supported by AMF1 200 is 2 (eMBBATT and mIOT). The total number of NSSAIs supported by AMF2 202 is 1 (mIOT). Accordingly, the relevance score for AMF1 200 is calculated as follows:

$$R = C/T$$
$$= 1/2$$
$$= 0.5.$$

The relevance score for AMF2 202 can be calculated using the following expression:

$$R = C/T$$
$$= 1/1$$
$$= 1.0.$$

If the loadings of AMF1 200 and AMF2 202 are equal, for example, 50%, the weight for AMF1 200 may be calculated as follows:

$$W = R/L$$
$$= 0.5/(0.5)$$
$$= 1.0.$$

The weight for AMF2 202 determined using the following expression:

$$W = R/L$$
$$= 1/(0.5)$$
$$= 2.0.$$

Returning to the message flow in FIG. 5, in line 6, NSSF 116 returns AMF2 202 as the response candidate AMF because the most relevant selection algorithm resulted in AMF2 202 as the AMF having the highest weight value. In alternate implementation, NSSF 116 may return a prioritized list of AMFs that are capable of providing the requested service along with the corresponding weights. For example, in FIG. 5, the list would include the identity of AMF1 200 with a weight of 1 and AMF2 202 with a weight of 2.0.

It can be seen from the example described with respect to FIG. 5 that the AMF relevance determination algorithm results in preferentially assigning AMFs that provide the smallest set of matching network slice services to UE sessions. For example, in FIG. 5, both AMF1 200 and AMF2 202 support the requested mIOT service. However, AMF1 200 also supports eMBBATT service. As a result, if the UE session were assigned to AMF1, a UE that needed access to AMF1 200 for its emBBATT service may be prevented from accessing the resources of AMF1 200. Because AMF2 202 only provides mIOT service, it is more efficient to assign a UE requesting mIOT service to AMF2 202, assuming that the loading of AMF1 200 and AMF2 202 is the same.

Figure 6:
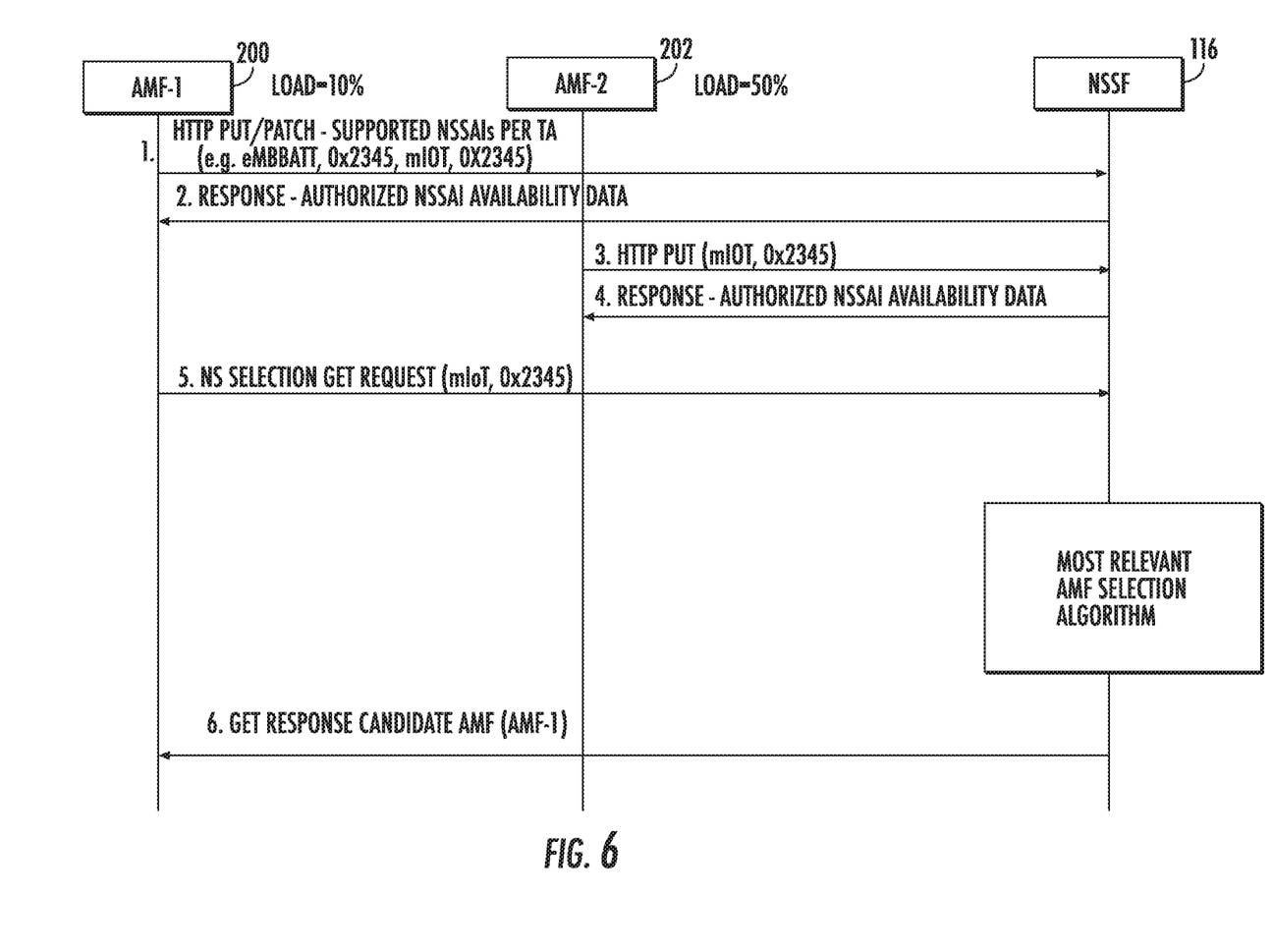
FIG. 6 is a message flow diagram illustrating an alternate example of an NSSF providing for policy-based AMF selection based on NSSAI availability information and AMF loading information.

FIG. 6 illustrates another example of providing for NSSAI availability-based AMF selection where the loading of AMFs is considered in the AMF selection process. Referring to FIG. 6, in line 1, AMF1 200 sends a HTTP PUT/PATCH message to NSSF 116 indicating the network slice capabilities of AMF1 200. In the illustrated example, AMF1 200 supports mIOT service for transfer areas 0x2345. In line 2, NSSF 116 responds to the HTTP PUT/PATCH message.

In line 3, AMF2 202 sends an HTTP PUT message to NSSF 116 indicating that AMF2 202 provides mIOT service for transfer areas U0x2345. In line 4, NSSF 116 responds to the HTTP PUT message from AMF2 202. Thus, after line 4, NSSF 116 stores supported NSSAI availability information for AMF1 200 and AMF2 202 for transfer area 0x2345.

In line 5 of the message flow diagram, NSSF 116 receives an NS selection request from AMF1 200 requesting mIOT service for a UE. In response to the NS selection GET request message, NSSF 116 computes the relevance and waits for AMF1 200 and AMF2 202. Using the formulas above, the relevance score for AMF1 200 is calculated as follows:

$$R = C/T$$
$$= 1/1$$
$$= 1.0$$

The relevance score for AMF2 202 is calculated using the following expression:

$$R = C/T$$
$$= 1/1$$
$$= 1.0.$$

Thus, the relevance scores of AMF1 200 and AMF2 202 are equal. In this example it is assumed that AMF1 is 10% loaded and AMF2 is 50% loaded. Accordingly, the weight for AMF1 200 is calculated as follows:

$$W = R/L$$
$$= 1.0/(0.1)$$
$$= 10.0$$

The weight for AMF2 202 is determined as follows:

$$W = R/L$$
$$= 1/0.5$$
$$= 2.0$$

Thus, in this example, AMF1 200 has a higher weight than AMF2 202. Accordingly, in line 6, NSSF 116 returns a list including AMF1 200 and AMF2 202 with AMF1 200 being preferred due to its higher weight.

Figure 7:
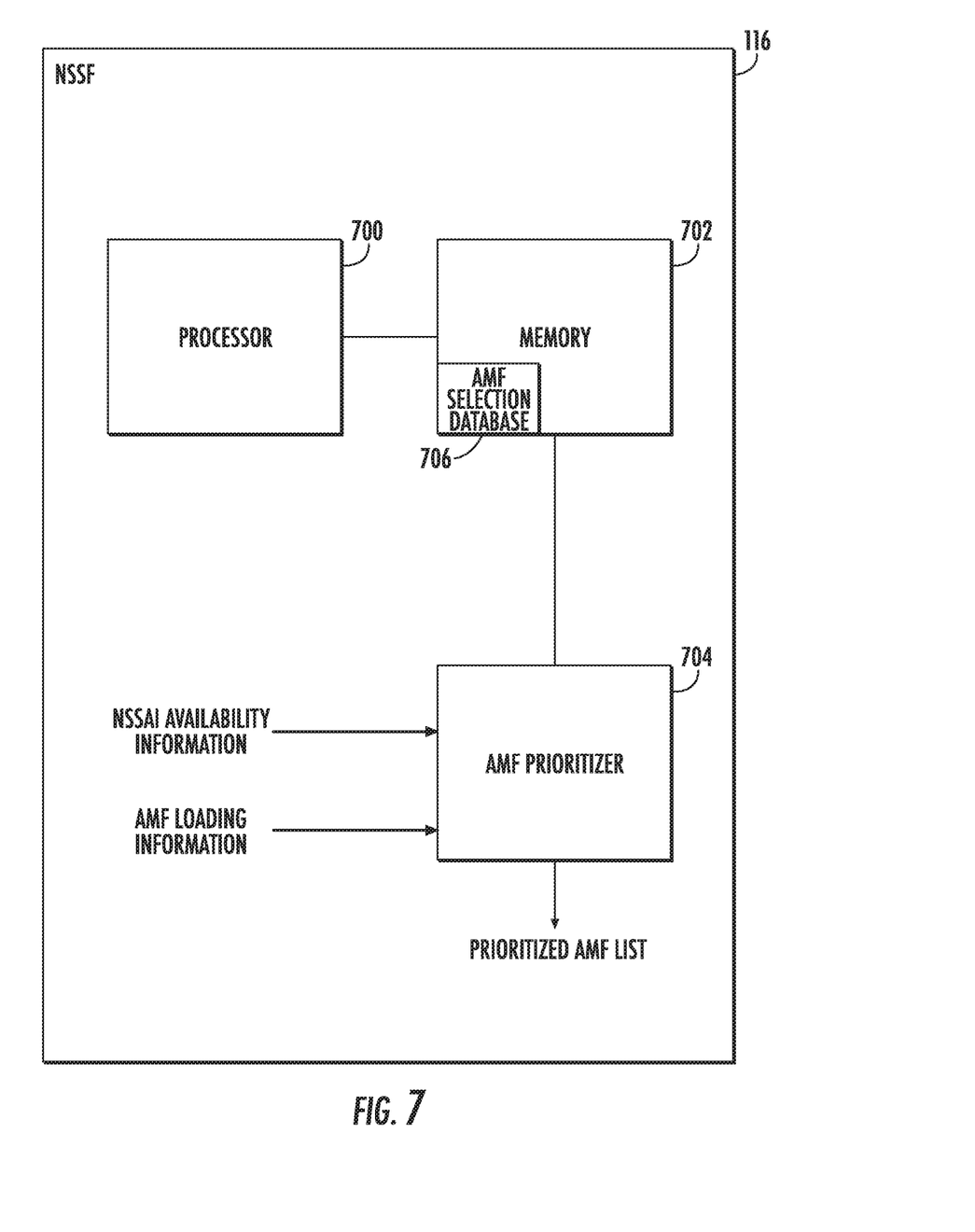
FIG. 7 is a block diagram illustrating an exemplary NSSF that provides for policy-based AMF selection based on NSSAI availability information.

FIG. 7 is a block diagram illustrating an exemplary NSSF capable of performing NSSAI relevance determination and facilitating AMF selection using NSSAI availability information. Referring to FIG. 7, NSSF 116 includes at least one processor 700 and a memory 702. An AMF prioritizer 704 may be executable by processor 700 and reside in memory 702. AMF prioritizer 704 obtains NSSAI availability information using the NSSAI availability procedure described above. AMF prioritizer 704 may also obtain AMF loading information by communicating with the NRF. AMF prioritizer 704 may store the NSSAI availability information and the AMF loading information in an AMF selection database 706. Using Table 2 above as an example, the AMF selection database 706 may include the NSSAI availability information on a per TA basis as illustrated in Table 2. In addition, AMF loading information may be added as a third column or field to each database entry.

AMF prioritizer 704 may receive NS selection GET request messages from AMFs, identify requested NSSAI information in the request messages, and use the NSSAI availability and AMF loading information stored in AMF selection database 706 to determine a relevance and a weight for each AMF capable of providing the requested network slice service. AMF prioritizer 704 may return a prioritized list of one or more AMFs capable of providing access to the requested network slice services. The receiving AMF may use the prioritized list to select an AMF and forward the registration request for the user session to the selected AMF.

Figure 8:
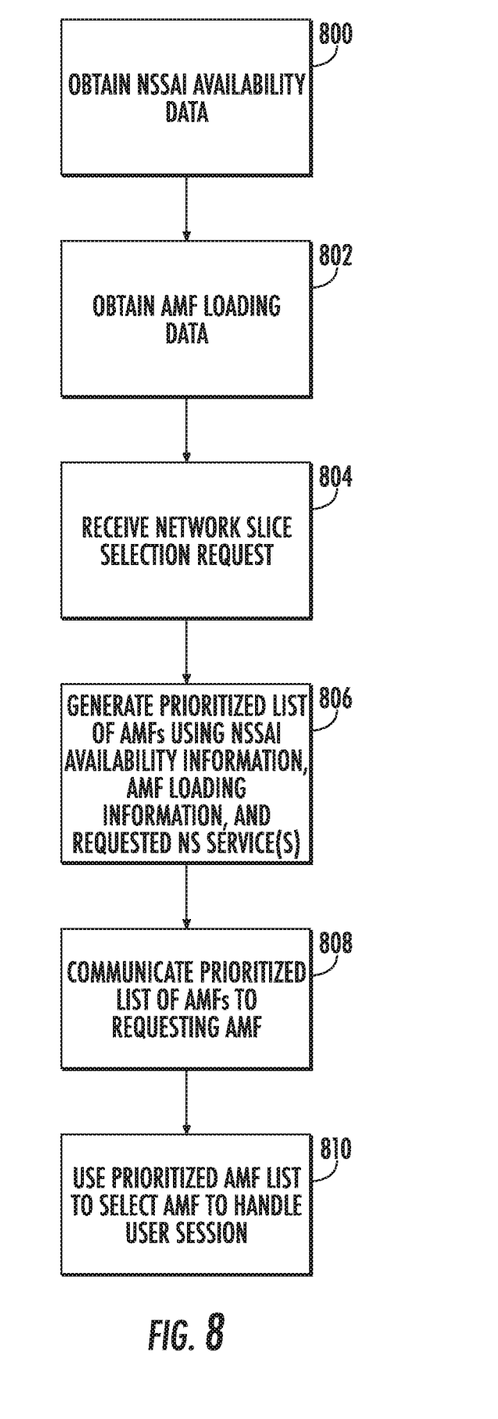
FIG. 8 is a flow chart illustrating an exemplary process for policy-based AMF selection using NSSAI availability information.

FIG. 8 is a flow chart illustrating an exemplary process for providing for policy-based AMF selection using NSSAI availability information. The steps illustrated in FIG. 8 may be performed at a network slice selection function including at least one processor. Referring to FIG. 8, in step 800, NSSF 116 obtains NSSAI availability information regarding a plurality of AMFs using an NSSAI availability service. For example, NSSF 116 may receive NSSAI availability information from AMFs through HTTP PUT/PATCH messages specifying supported NSSAIs per transfer area.

In step 802, the process includes obtaining AMF loading information. NSSF 116 may obtain AMF loading information from NRF 100 by sending an NF discovery request to NRF 100, where the NF discovery request identifies the AMFs for which NSSF 116 desires to obtain AMF loading information. NRF 100 may respond to the NF discovery request with a list of AMF identities and corresponding loading information. In one example, the AMF loading information may indicate a percentage of processing capacity of the AMF that is currently being used.

In step 804, the process includes receiving a network slice selection request message specifying a network slice service requested by user equipment. For example, NSSF 116 may receive an NS selection GET request message identifying one or more requested NSSAIs and corresponding transfer area.

In step 806, the process includes generating, based on the NSSAI availability information, the AMF loading information, and the network slice service requested by the UE, a prioritized list including at least one AMF for supporting the network slice service. For example, NSSF 116 may identify, based on the NSSAIs in the NS selection request and the supported NSSAIs obtained from the NSSAI availability service, a list of AMFs capable of providing the requested NS service(s). In the example described above, the priorities are based on the ratio of the number of requested network slice services provided by the AMF to the total number of services provided by the AMF and the relative loading of the AMFs. In one further example, the prioritized list may include only the AMF with the highest relative priority.

In step 808, the prioritized list is provided to the requesting AMF. In one example, NSSF 116 may send a list and corresponding weights to the requesting AMF, where the weights are computed from the relevances and the load percentages of the AMFs computing using the formulas described above. In another example, NSSF 116 may send a list of AMF identities, where the order of the AMFs in the list indicates their relative priorities.

In step 810, the list is used to select an AMF for handling the user session. For example, the requesting AMF may receive the prioritized list of AMFs and select the AMF with the highest weight (assigned based on relevance and loading) in the list to provide access to the requested network slice service.

The subject matter described herein allows the NSSF to use NSSAI availability information to select and prioritize a candidate AMF list. Using NSSAI availability information to select and prioritize a candidate AMF list, especially where AMF relevance is considered as a prioritization criterion, makes it more likely that a UE session will be forwarded to an AMF that is most specialized to provide the network slice service requested by the UE rather than to a generic AMF that supports a larger set of network slice services. The subject matter described herein makes traffic segregation based on quality of service (QoS) possible by prioritizing candidate AMFs based on their supporting S-NSSAI information. The subject matter described herein reduces the likelihood of overloading AMFs that support a larger set of S-NSSAIs by preferentially selecting AMFs with smaller sets of S-NSSAIs that match the NSSAIs requested by a UE.

The disclosure of each of the following references is incorporated herein by reference in its entirety:
1. 3GPP TS 23.501, "Technical Specification Group Services and System Aspects; System Architecture for the 5G System (5GS)," Stage 2 (Release 16) V16.2.0 (2019 September).
2. 3GPP TS 23.502, "Technical Specification Group Services and System Aspects; Procedures for the 5G System (5GS)," Stage 2 (Release 16) V16.2.0 (2019 September).
3. 3GPP TS 29.510, "Technical Specification Group Core Network and Terminals; 5G System; Network Function Repository Services," Stage 3 (Release 16) V16.1.1 (2019 October).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for providing for policy-based access and mobility management function (AMF) selection using network slice selection assistance information (NSSAI) availability information obtained from an NSSAI availability service, the method comprising:
    at a network slice selection function (NSSF) including at least one processor:
        obtaining, from an NSSAI availability service, NSSAI availability information regarding a plurality of AMFs;
        receiving, from a first AMF, a network slice selection request specifying a network slice service requested by a user equipment (UE);

generating, based on the NSSAI availability information and the network slice service requested by the UE, a prioritized list including an identity of at least one AMF for supporting the network slice service, wherein generating the prioritized list includes prioritizing a second AMF that supports the requested network slice service over a third AMF that supports the requested network slice service and at least one network slice service other than the requested network slice service and that is not supported by the second AMF; and communicating the prioritized list to the first AMF.

2. The method of claim 1 wherein obtaining the NSSAI availability information includes receiving hypertext transfer protocol (HTTP) messages from the AMFs, wherein each HTTP message indicates supported NSSAIs per transfer area (TA) for one of the AMFs.

3. The method of claim 1 wherein receiving the network slice selection request includes receiving the network slice selection request containing at least one NSSAI identifying the network slice service requested by the UE.

4. The method of claim 1 wherein prioritizing the second AMF over the third AMF includes computing a relevance R for the second and third AMFs, where R is equal to C/T, where C is equal to a number of common NSSAIs between NSSAIs requested by the UE and NSSAIs supported by the second or third AMF and T is equal to a total number of NSSAIs supported by the second or third AMF.

5. The method of claim 4 comprising obtaining load percentages of each of the AMFs.

6. The method of claim 5 wherein obtaining the load percentages includes obtaining the load percentages from a network function repository function (NRF).

7. The method of claim 5 wherein generating the prioritized list includes computing a weight W for the second and third AMFs, where the weight W is equal to R/L, L is the load percentage of the second or third AMFs.

8. The method of claim 7 wherein communicating the prioritized list to the first AMF includes communicating AMF identities of the second and third AMFs and the weights computed for the second and third AMFs to the first AMF.

9. The method of claim 7 wherein communicating the prioritized list to the first AMF includes communicating AMF identities of the second and third AMFs in an order corresponding to the weights computed for the second and third AMFs.

10. A system for providing for policy-based access and mobility management function (AMF) selection using network slice selection assistance information (NSSAI) availability information obtained from an NSSAI availability service, the system comprising:

a network slice selection function (NSSF) including at least one processor; and an access and mobility management function (AMF) prioritizer implemented by the at least one processor for obtaining, using an NSSAI availability service, NSSAI availability information regarding a plurality of AMFs, receiving, from a first AMF, a network slice selection request specifying a network slice service requested by a user equipment (UE), generating, based on the NSSAI availability information and the network slice service requested by the UE, a prioritized list including an identity of at least one AMF for supporting the network slice service, and communicating the prioritized list to the first AMF, wherein generating the prioritized list includes prioritizing a second AMF that supports the requested network slice service over a third AMF that supports the requested network slice service and at least one network slice service other than the requested network slice service and that is not supported by the second AMF.

11. The system of claim 10 wherein the AMF prioritizer is configured to obtain the NSSAI availability information by receiving hypertext transfer protocol (HTTP) messages from the AMFs, and each HTTP message indicates supported NSSAIs per transfer area (TA) for one of the AMFs.

12. The system of claim 10 wherein the network slice selection request contains at least one NSSAI identifying the network slice service requested by the UE.

13. The system of claim 10 wherein the AMF prioritizer is configured to prioritize the second AMF over the third AMF by computing a relevance R for the second and third AMFs, where R=C/T, where C is equal to a number of common NSSAIs between NSSAIs requested by the UE and NSSAIs supported by the second or third AMF and T is equal to a total number of NSSAIs supported by the second or third AMF.

14. The system of claim 13 the AMF prioritizer is configured to obtain load percentages for the second and third AMFs and to compute weight values W for the second and third AMFs, where the weight value W for the second or third AMF is equal to R/L and L is the load percentage of the second or third AMF.

15. The system of claim 14 wherein the AMF prioritizer is configured to obtain the load percentages from a network function repository function (NRF).

16. The system of claim 14 wherein the prioritized list of AMFs includes AMF identities of the second and third AMFs and the weight values computed for the second and third AMFs.

17. The system of claim 14 wherein the prioritized list includes an ordered list of AMF identities of the second and third AMFs and an order of the AMF identities in the list corresponds to the weight values computed for the second and third AMFs.

18. A non-transitory computer readable medium having stored thereon executable instructions that when executed by a processor of a computer control the computer to perform steps comprising:

at a network slice selection function (NSSF):

obtaining, from a network slice selection assistance information (NSSAI) availability service, NSSAI availability information regarding a plurality of AMFs;

receiving, from a first access and mobility management function (AMF), a network slice selection request specifying a network slice service requested by a user equipment (UE);

generating, based on the NSSAI availability information and the network slice service requested by the UE, a prioritized list including an identity of at least one AMF for supporting the network slice service, wherein generating the prioritized list includes prioritizing a second AMF that supports the requested network slice service over a third AMF that supports the requested network slice service and at least one network slice service other than the requested network slice service and that is not supported by the second AMF; and communicating the prioritized list to the first AMF.

* * * * *

UNITED STATES PATENT AND TRADEMARK OFFICE
CERTIFICATE OF CORRECTION

PATENT NO. : 11,197,176 B2
APPLICATION NO. : 16/676006
DATED : December 7, 2021
INVENTOR(S) : Pokkunuri et al.

Page 1 of 1

It is certified that error appears in the above-identified patent and that said Letters Patent is hereby corrected as shown below:

On the Title Page

On page 2, Column 2, item (56) under Other Publications, Line 9, delete "Genelalion" and insert -- Generation --, therefor.

In the Claims

In Column 16, Line 23, in Claim 14, after "claim 13" insert -- wherein --.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*